United States Patent [19]
Berg et al.

[11] Patent Number: 6,070,679
[45] Date of Patent: Jun. 6, 2000

[54] POWERED UTILITY CART HAVING ENGAGEMENT ADAPTERS

[75] Inventors: David W. Berg, Plymouth; Joseph D. Berg, Little Falls; Dennis R. Johnson, Maple Grove, all of Minn.

[73] Assignee: Lindbergh Manufacturing, Inc., Little Falls, Minn.

[21] Appl. No.: 08/891,003

[22] Filed: Jul. 10, 1997

Related U.S. Application Data

[60] Provisional application No. 60/021,528, Jul. 11, 1996.

[51] Int. Cl.[7] ................................................. B62D 51/04
[52] U.S. Cl. .................. 180/19.2; 180/211; 280/33.992; 280/292; 280/510; 280/DIG. 4
[58] Field of Search ......................... 280/33.991, 33.992, 280/33.998, 510, DIG. 4, 204, 292, 495, 499, 502, 491.5; 180/11, 19.1, 19.2, 54.1, 53.1, 65.1, 210, 211

[56] References Cited

U.S. PATENT DOCUMENTS

| | | | |
|---|---|---|---|
| 667,154 | 1/1901 | McDonald et al. | 280/204 |
| 1,261,237 | 4/1918 | Jacob | 280/292 |
| 1,739,456 | 12/1929 | Hansen | 280/292 |
| 2,072,611 | 3/1937 | Von Kories | 115/19 |
| 2,421,867 | 6/1947 | Bizjak | 180/12 |
| 2,494,505 | 1/1950 | Bouchard | 180/53.1 |
| 2,762,443 | 9/1956 | Dunham et al. | 180/11 |
| 2,851,119 | 9/1958 | Thompson et al. | 180/54.1 |
| 3,315,758 | 4/1967 | Allen | 180/77 |
| 3,339,662 | 9/1967 | Hanson et al. | 180/54.1 |
| 3,394,770 | 7/1968 | Goodacre | 180/54.1 |
| 3,430,983 | 3/1969 | Jones | 280/402 |
| 3,454,285 | 7/1969 | Peursem | 280/459 |
| 3,662,849 | 5/1972 | Bostad et al. | 180/54.1 |
| 4,090,578 | 5/1978 | Shinoda et al. | 280/830 |
| 4,289,212 | 9/1981 | Immel | 180/19.1 |
| 5,064,209 | 11/1991 | Kurschat | 280/204 |
| 5,082,074 | 1/1992 | Fischer | 180/11 |
| 5,322,306 | 6/1994 | Coleman | 280/33.992 |
| 5,439,069 | 8/1995 | Beeler | 180/11 |
| 5,573,078 | 11/1996 | Stringer et al. | 180/19.2 |
| 5,727,805 | 3/1998 | Roque | 280/478.1 |
| 5,791,669 | 8/1998 | Brodden et al. | 280/47.34 |
| 5,860,485 | 1/1999 | Ebbenga | 180/19.2 |
| 5,934,694 | 8/1999 | Schugt et al. | 280/33.991 |

*Primary Examiner*—Brian L. Johnson
*Assistant Examiner*—Bridget Avery
*Attorney, Agent, or Firm*—Vidas, Arrett & Steinkraus, P.A.

[57] ABSTRACT

The present inventive device generally allows a user to easily engage and push or pull heavy and unwieldy object(s), most notably a line of nested shopping carts, effectively and without undue strain. The cart is designed specifically with universal utility in mind. The power is supplied by either an electrically driven motor or internal combustion engine. Power is transmitted to a transaxle with belts or an electric motor electronically controlled. A simple forward/reverse control via throttle handles causes cart movement and steering is achieved through dual rear castors. The front of the cart contains a receiver that allows easy attachment for a multitude of attachments for a variety of uses. A square tube fitment with a quick release device lets the cart be configured for different markets and easy field change. One such attachment is a shopping cart adapter, which attaches to the cart through the receiver connection. It has two quick connect devices that attach to the rear of most available shopping carts. It has a center pivot that facilitates steering and positioning one or several carts.

7 Claims, 12 Drawing Sheets

POWERED UTILITY CART HAVING ENGAGEMENT ADAPTERS

Claims provisional application Ser. No. 60/021,528 filed on Jul. 11, 1996.

FIELD OF THE INVENTION

The present invention relates to a pushing vehicle primarily for collecting and maneuvering nested shopping carts. More specifically, it relates to an improved pushing vehicle having a superior connecting means for coupling the pushing vehicle with the nested shopping carts. The pushing vehicle may also be used for driving other devices such as sleds, carts, wagons, trailers or wheelbarrows.

BACKGROUND OF THE INVENTION

It is a common sight to see a large number of ordinary basket-type shopping carts in parking lots ready to be collected and pushed back to the store to be reused by customers. Typically it takes one to three people to push these carts in single file nestled together back to the store due to the unwieldy length and weight of the large number of carts. The job of returning the line of shopping carts to the store had been almost exclusively a manual task due to the unavailability of equipment. Regular forklifts were thought to be too large and incapable of adequately coupling to the line of carts in addition to being too large to fit through the store doors. Recently, some powered means have been developed to assist in the process. However, all of the known prior art suffers from disadvantages which are addressed by the present invention, primarily the coupling means which acts as an interface between the powered pushing device and the line of carts or whatever is being manipulated.

U.S. Pat. No. 5,439,069 issued to Beeler on Aug. 8, 1995 discloses a powered pusher vehicle for moving a train of nested shopping carts. The vehicle having a main body portion with a central drive wheel powered by an electric motor through a worm gear transmission. The vehicle includes a pair of latch members for automatically connecting the front of the vehicle to a rearmost one of the nested carts.

U.S. Pat. No. 5,573,078 issued to Stringer et al. on Nov. 12, 1996 discloses a steerable, self-powered device for use in towing and guiding a number of shopping carts attached together.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

SUMMARY OF THE INVENTION

The present inventive device generally allows a user to easily engage and push or pull heavy and unwieldy object(s), most notably a line of nested shopping carts, effectively and without undue strain. The cart is designed specifically with universal utility in mind. The power is supplied by either an electrically driven motor or internal combustion engine. Power is transmitted to a transaxle with belts or an electric motor electronically controlled. A simple forward/reverse control via throttle handles causes cart movement and steering is achieved through dual rear castors.

The front of the cart contains a receiver that allows easy attachment for a multitude of attachments for a variety of uses. A square tube fitment with a quick release device lets the cart be configured for different markets and easy field change. One such attachment is a shopping cart adapter, which attaches to the cart through the receiver connection. It has two quick connect devices that attach to the rear of most available shopping carts. It has a center pivot that facilitates steering and positioning one or several carts.

The potential fields of use for the present device are numerous and the listing of specific uses is in no way meant to limit the use of the invention to the particular field chosen for exposition of the details of the invention.

DETAILED DESCRIPTION OF THE INVENTION

Figure 1:
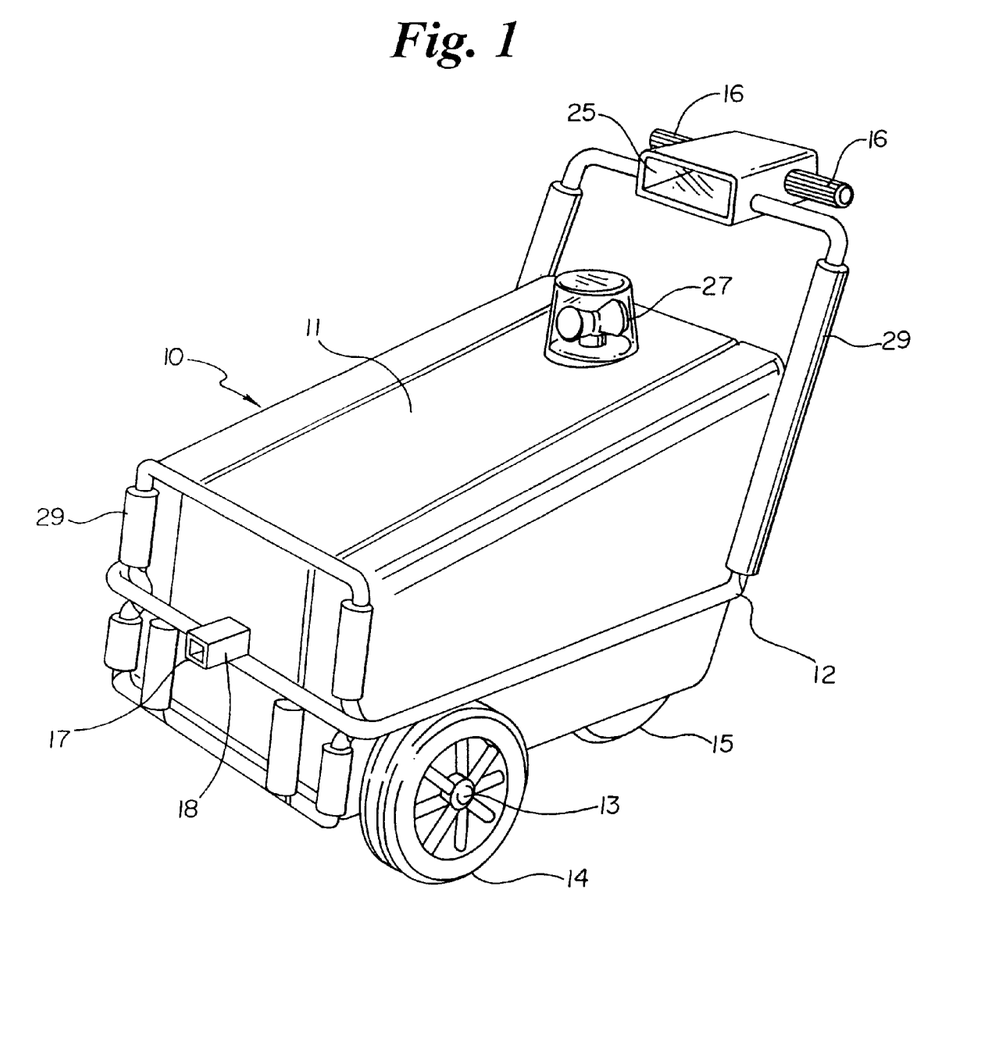
FIG. 1 shows a perspective view of one embodiment of the utility cart.

In FIG. 1, the powered utility cart, generally designated as 10, is depicted. The utility cart 10 generally comprises a housing 11 enclosing a power supply, the power supply being either an electrically driven motor or a combustible engine, a support/protection frame 12, a front drive transaxle 13 which drives wheels 14 or tracks, dual rear steerable castors 15 and a receiver connection 17, which is preferably a square tube fitment with a quick release pin connection 18. Preferably, it has a simple forward/reverse selector, shown in FIG. 1 as steering handles 16, which preferable function as twist grip throttles, twisting forward for forward and backward for reverse, a headlight 25, a flashing safety light 27 and bumper pads 29. The power supply or propulsion means drives the transaxle 13, preferably approximately a 1500 lb. Differential/transaxle and may be either a gas powered engine or, most preferably, a motor driven by a rechargeable electric battery, preferably 36 v (3) 115 AMP batteries. One of ordinary skill would be able to devise a controllable propulsion means to drive the transaxle, and as such, further disclosure of the power supply is unnecessary.

The receiver connection 17 is mounted onto the front end of the utility cart and is devised to allow for releasable attachment of various devices to facilitate coupling between the utility cart and the object which is to be moved. Preferably, the receiver connection 17 is a square tube fitment welded or otherwise secured to the front end of the body of the utility cart. Preferably welded to the frame 12 and/or the infrastructure of the cart or secured to a plate mounted on the front end of the utility cart. The receiver connection 17 also has a quick release connection 18, preferable a cotter pin connection.

Figures 2A, 2C:
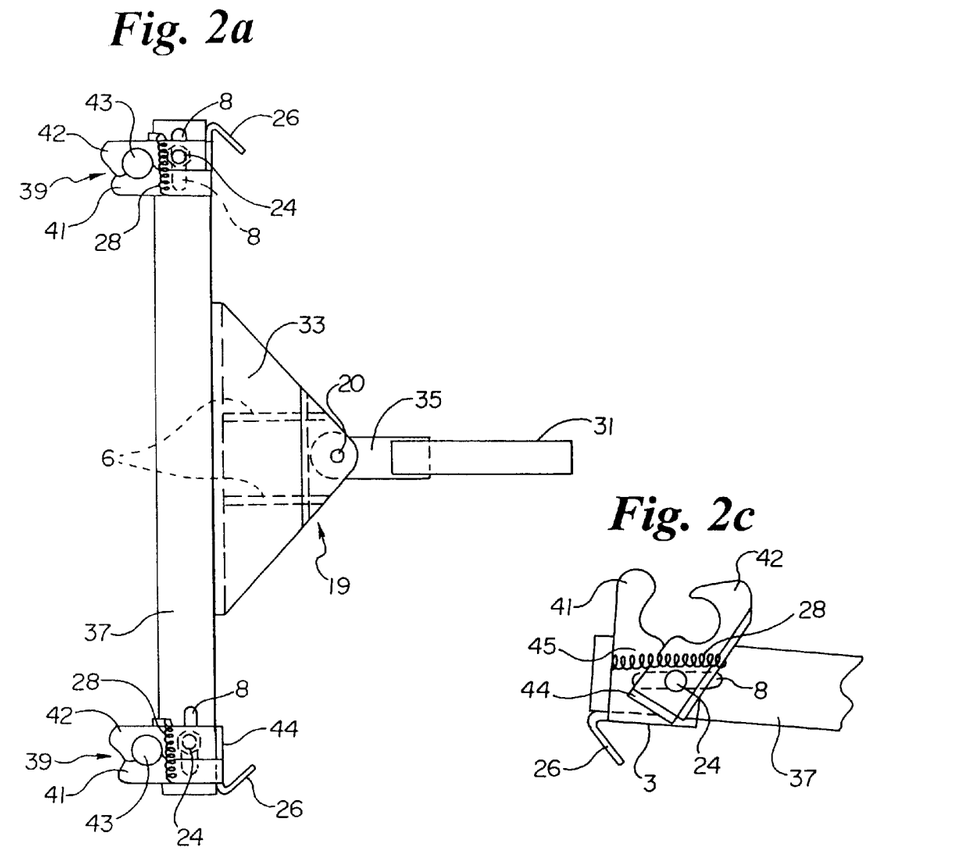
FIG. 2a–b show top and side views, respectively, of a shopping cart adapter.
FIG. 2c shows a blowup top view of a piece of the shopping cart adapter showing the adjustable quick connect device.
Figure 2B:
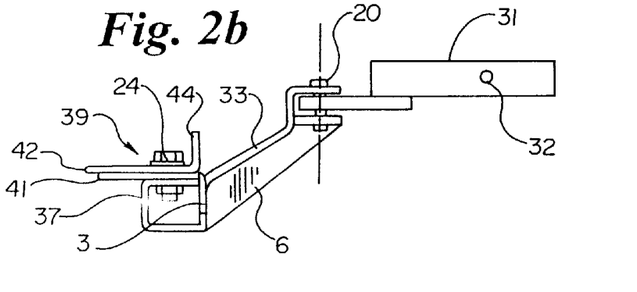

FIG. 2a shows a shopping cart adapter 19 which couples with the utility cart 10 and is used to secure and drive a plurality of shopping carts. The device attaches to the cart 10, via a protruding tongue 31 which is inserted and secured into the receiver connection 17, the pin of which slides through opening 32. The tongue 31 has a adapter bar 35 welded thereto and is thereby pivotally connected to an intermediate plate 33 at a center pivot 20, which is preferably a nut and bolt connection. The pivoting action facilitates steering and positioning of one or several carts and makes collecting carts in a parking lot much easier. This pivot point 20 may be locked in a straight position when the utility cart is driven by remote control, the details of which are discussed further below. The intermediate plate 33 is in turn connected (preferably welded) to a cross bar 37, which is preferably a C shaped bar. The intermediate plate 33 is preferably configured to slope downward, as illustrated in FIG. 2b, such as to position the cross bar 37 in an ideal position to couple with the legs of a shopping cart. Gussets 6 should be provided (shown in FIG. 2b and FIG. 2a in phantom) mounted under plate 33 for extra support. The cross bar 37 has two adjustable quick connect devices (QCD) 39, that are adjustably positioned, via elongated slots 8 (partially shown in phantom) in the cross bar, along the cross bar 37 and are designed to attach to the rear legs of most available shopping carts via a spring 28 load pivotable connection 24. Slots 8 allow the QCD's 39 to slide freely to account for the differing widths between the rear legs of shopping carts. Pivotable connection 24 is preferably a nut and bolt connection, and is arranged to allow QCD 39 to optionally freely slide in slot 8 and allows arm 42 to pivot. The connection devices 39 are coupled to the shopping carts by urging the shopping cart legs into lower 41 and upper 42 engagement arms of the spring 28 load pivotable connecting device 39 which are horizontally placed in an overlapping configuration. As the shopping cart is urged inward, the upper arm 42 pivots outward around pivot point 24 while arm 41 is fixed into place (still being able to slide in slot 8 to allow the QCD 39 to adjust for the differing widths between shopping cart legs) on the cross bar 37, allowing insertion of the cart leg 43 between the engagement arms. Once the cart leg slides into place 43, the pivoted engagement arm returns to its idle position via spring 28, which is connected to arm 42 and to some fixed position either on the cross bar or on arm 41 as shown in FIG. 2c at point 45, securing the shopping cart. The shopping cart leg is released by sliding the pull release lever 44 sideways, effectively pivoting the engagement arm 42 to free the cart leg 43. FIG. 2c illustrates the adjustable quick connect devices 39 in their open position. This embodiment provides easy coupling and uncoupling of the shopping cart. Preferably, steering stoppers 26 are positioned on the ends of the cross bar 37 to prevent overpivoting of the shopping cart adapter 19 at point 20.

Figure 2D:
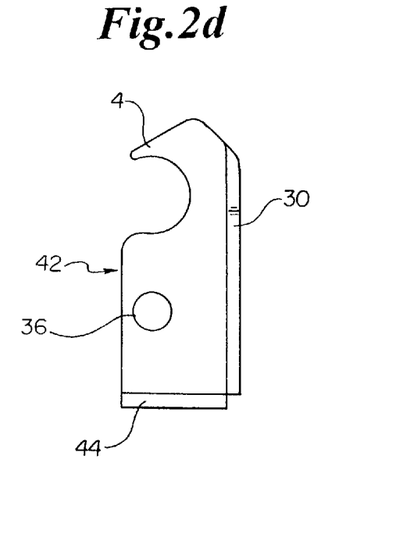
FIGS. 2d–2i show top and side views of portions of the adjustable quick connect device.
Figure 2E:
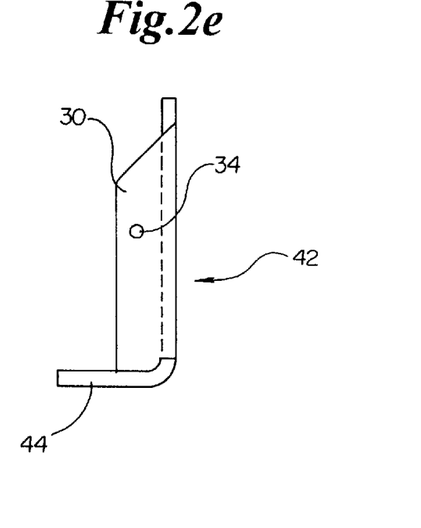

FIGS. 2d through 2i illustrate the preferred dimensions and configurations of the arms 41 and 42. FIGS. 2d and 2e show top and side views, respectively, of the arm 42. Arm 42 preferably has a hook like 4 configuration to easily engaged a cart leg and has a raised side panel 30 to receive the spring 28 through aperture 34. The arm 42 is pivotally secured to arm 41 and the cross bar 37 through aperture 36. Pull release lever 44 allow for manual pivoting.

Figure 2F:
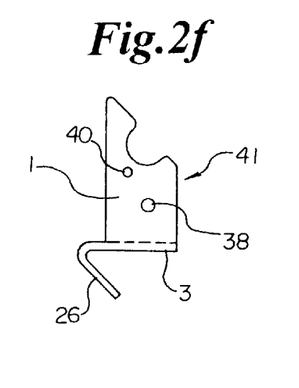
Figure 2G:
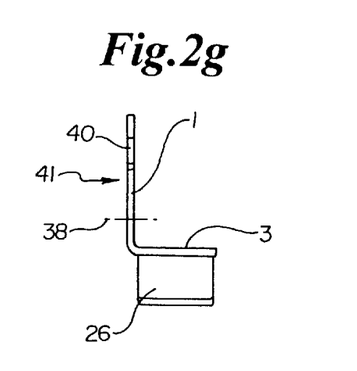

FIGS. 2f and 2g show top and side views, respectively, of the arm 41. The arm 41 has a receiving panel 1 configured to coordinate with arm 42 to receive a cart leg and is secured to arm 42 and the cross bar 37 at pivot point 24 through aperture 38. The arm 41 is kept from pivoting by a securing panel 3 which is at approximately a 90° angle from the receiving panel and wraps down over cross bar 37 on the rear, open C side, but once again does not prevent sliding in slot 8, only pivoting on axis 24. The fixed end 45 of the spring 28 may be connected to either arm 41, preferably at aperture 40, or the cross bar 37 so as to pivotally urge arm 42 around pivot point 24 into a closed position.

Figure 2H:
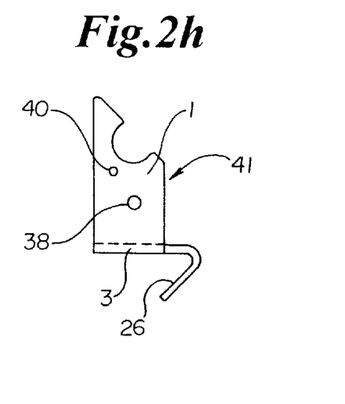
Figure 2I:
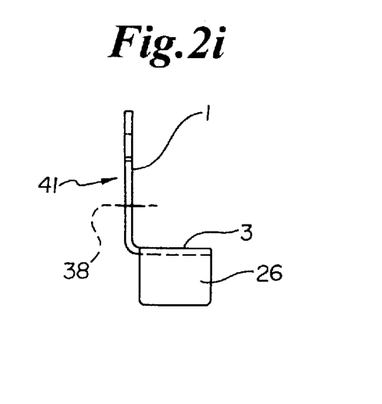

FIGS. 2h and 2i merely show front and side views of the arm 41 on the opposite side of the cross bar 37. Note should be taken that the steering stopper 26 is on the opposite side.

Figure 3:
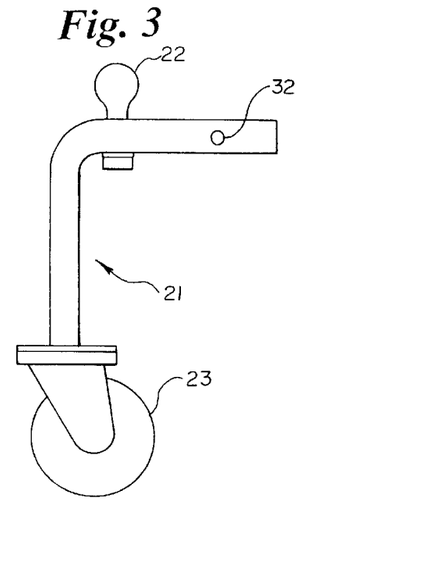
FIG. 3 is a perspective view of a tongue adapter.

The utility cart 10 may also be outfitted with a tongue adapter 21, as shown in FIG. 3. Moving and steering of boat and utility trailers in congested areas is a very difficult job. High tongue weights and heavy loads require several people or powered equipment like forklifts or small trucks. The tongue adapter 21 attaches to the cart 10 through the receiver connection 17 in the same manner as the shopping cart adapter 19. It has a receptacle for a standard trailer ball stud 22. The adapter also has a single front pivotable castor 23, for supporting tongue weight and facilitating steering. Its geometry, when loaded, turns the cart into a three wheeled unit that pivots and steers through the trailer ball stud 22.

Figure 4:
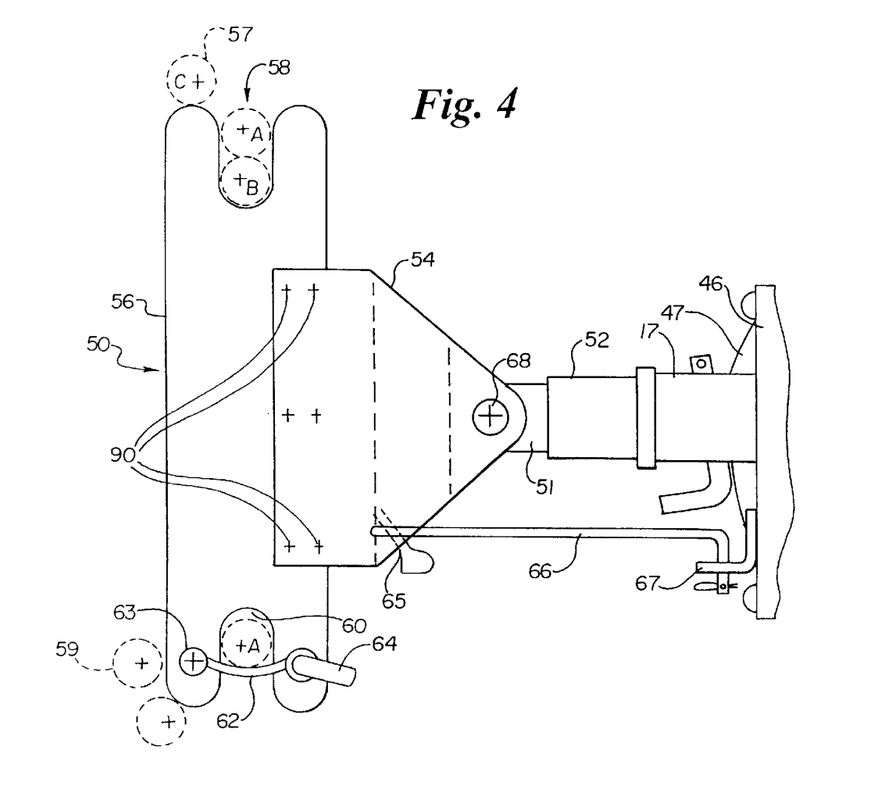
FIG. 4 shows a top view of a second embodiment of the shopping cart adapter.

FIG. 4 illustrates an alternative and preferred embodiment of the shopping cart adapter 50. The tongue 52, adapter bar 51 and the intermediate plate 54 are connected and configured substantially as that of the above mentioned shopping cart adapter 19. In this particular embodiment, a plate 46 is secured to the front of the utility cart and the receiver 17 is secured to, or through, preferably welded, thereto and supported by support wings 47. The cross bar 56, alternatively, is of a different configuration and construction and is secured to the intermediate plate 54 at securing points 90. Preferably the cross bar 56 is made of a rigid thermoplastic material so as to be non-damaging to the carts, doorways and cars and increase flexibility for engagement. The cross bar 56 has slots 58, 60 at either end for receiving the rear legs of the shopping carts. Slot 58 is deeper than slot 60 to allow for engagement of the shopping cart. FIG. 4 illustrates how the shopping cart is engaged. Insertion of the right rear cart leg 57 from position C to B into slot 58 allows the left cart leg 59, which correspondingly moves from position C to B, to clear the end of the cross bar 56 and slide into slot 60 at position A, which in turn slides the right leg of the cart into corresponding position A. The left leg is held in place by a securing device 62, which is preferably a pivoting curved metal bar that is rotatably fixed to the cross bar 56 at point 63 and secured with a pin 64 arrangement through the crossbar 56. Other methods of securing the left cart leg may be used, such as a strap or a cord.

The above shopping cart adapters may also include a steering lock-out rod 66 for remote control operation to prevent the shopping cart adapter from pivoting at pivot point 68, 20. The lock-out rod 66 is connected, preferably via cotter pins, through an aperture in the intermediate plate 65 and with a connecting member 67 which secured to, preferably welded, the front of the utility cart. In FIG. 4 the connecting member 67 is secured to plate 46. Steering under remote control operation is done by maneuvering the fowardmost shopping cart in the line of carts.

Figure 5:
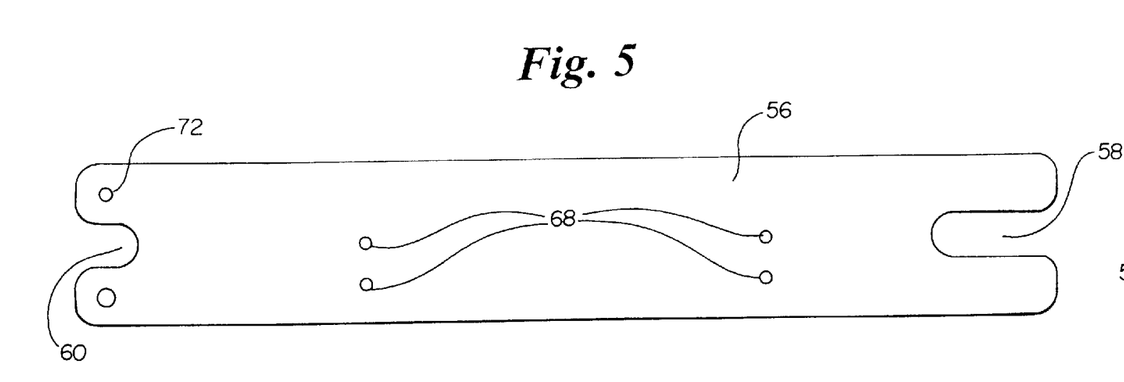
FIG. 5 is a top view of a cross bar for a shopping cart adapter.
Figure 5A:
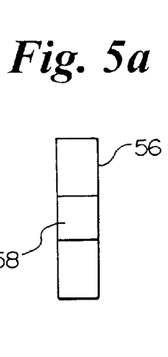

FIG. 5 illustrates the preferred configuration and dimensions of the cross bar 56. The openings 68 and 72 illustrate the preferred connection points of the cross bar 56 at which it is connected to the intermediate plate 70 and the securing device 72, respectively. As can be seen in this figure, slot 58 is deeper than slot 72 to facilitate engagement of the shopping carts as discussed above. Additionally, slot 72 is preferably only deep enough to hold the cart leg snugly such as to limit the side to side play when coupling has been achieved. Preferably, the cross bar 56 is made of high impact, high wear, no mar material, such as ultra high molecular weight polyethylene (UHMWPE).

Figure 6A:
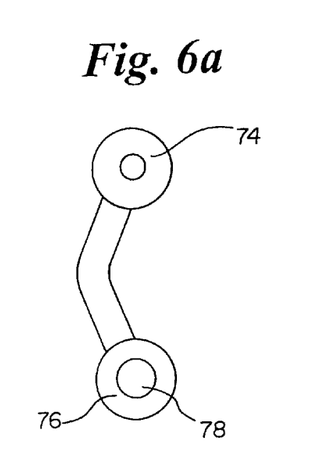
FIGS. 6a–b are front and side views of a securing device.
Figure 6B:
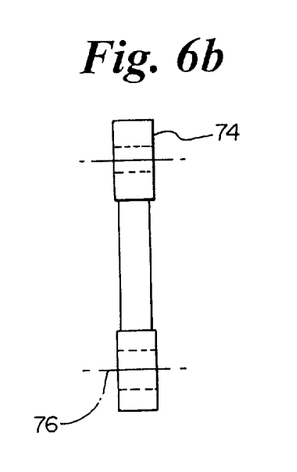

FIGS. 6a and 6b show front and side views of the preferred embodiment of the securing device 62. Essentially the device is a curved metal bar, one end 74 of which has an aperture and is secured to the cross bar 56 at pivot point 63 (see FIG. 4) and one end 76 has an orifice 78 to receive a pin 64, as shown in FIG. 4. The slot 60 and the securing device 62 are configured such that the rear leg of the shopping cart is snugly secured.

Preferably, the intermediate plate 54, as illustrated in FIGS. 7a–b and 8a–b in its preferred dimensions and configuration, comprises two plates of similar configuration, positioned face to face, both being pivotally secured to the tongue at one end and both being secured to the cross bar 56 in a sandwich configuration at the other.

Figure 7A:
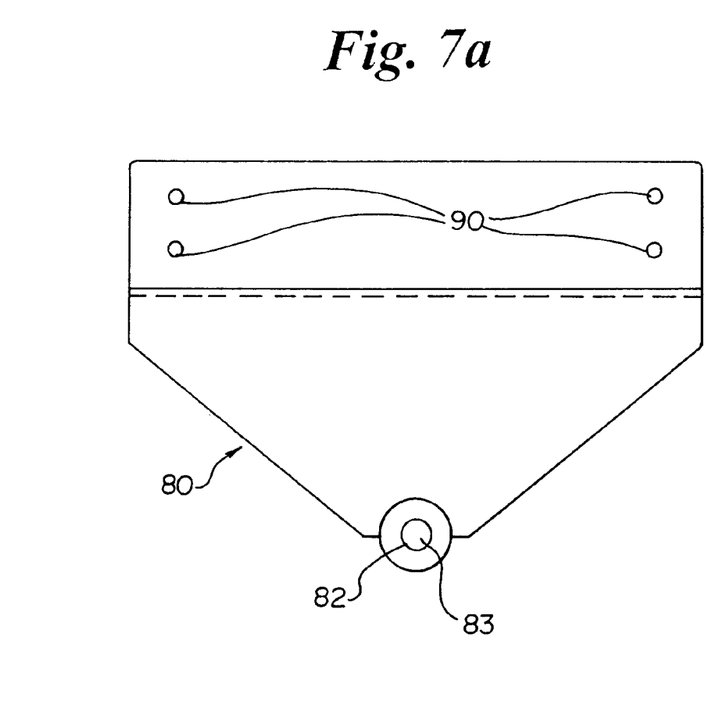
FIGS. 7a–b are top and side views of a top intermediate plate portion.
Figure 7B:
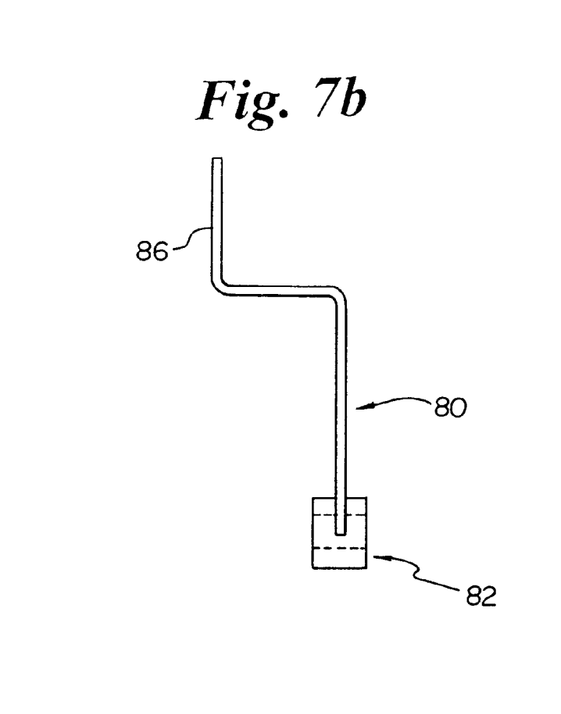
Figure 8A:
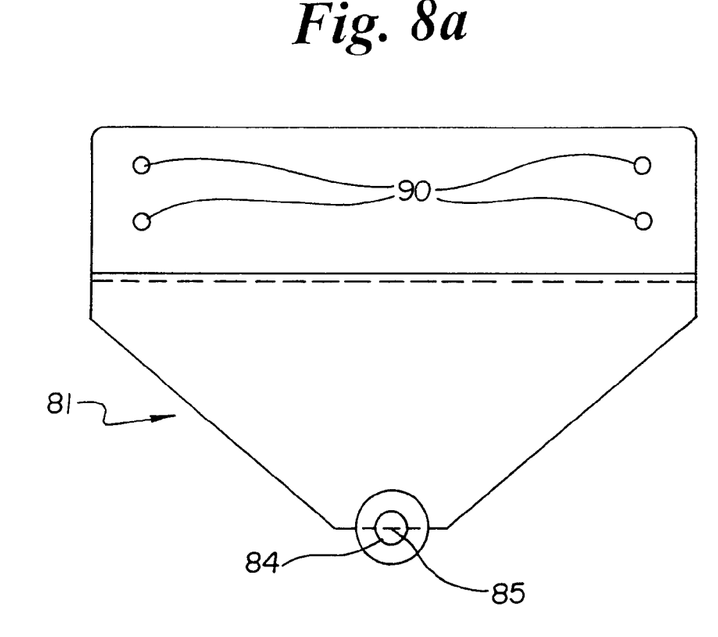
FIGS. 8a–b are top and side views of a bottom intermediate plate portion.
Figure 8B:
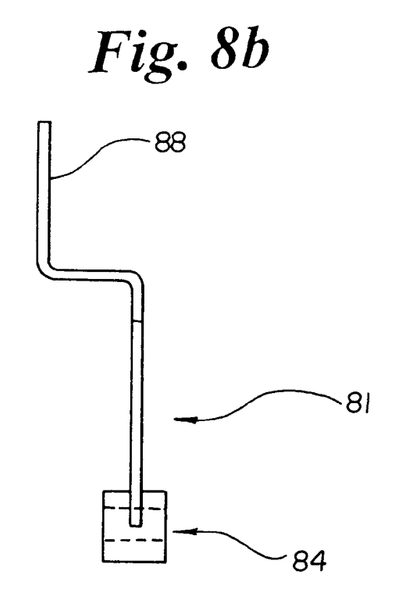
Figures 9A, 9B:
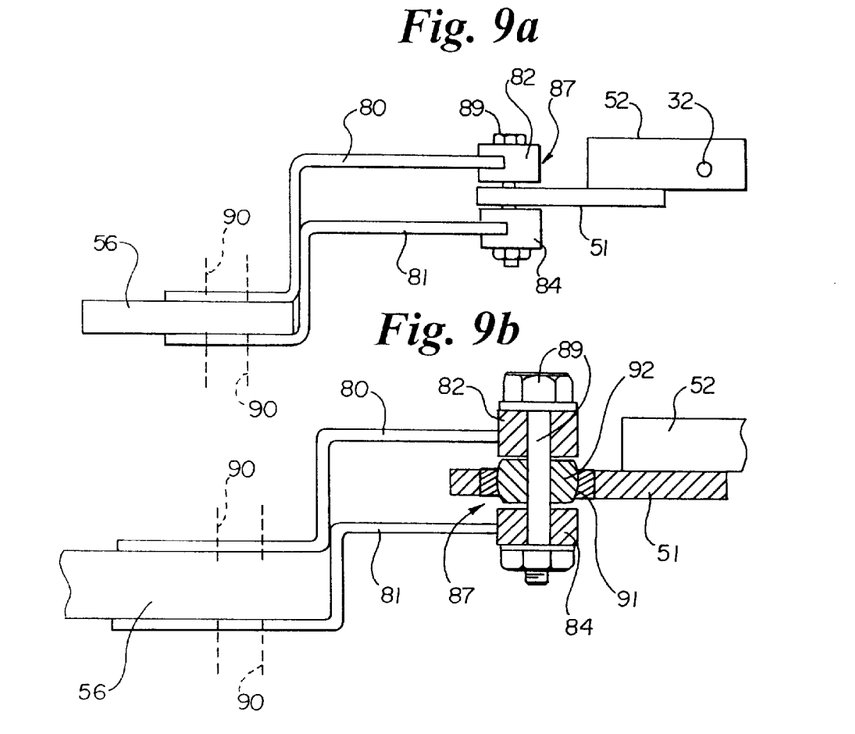
FIGS. 9a–9b show side views of a cross bar engaged by an intermediate plate.

See FIGS. 9a–b. FIGS. 7a–b show top and side views of the top intermediate plate 80 and FIGS. 8a–b show the same views of the bottom intermediate plate 81. Both plates have connecting members 82, 84 having apertures 83, 85 therethrough by which they are secured to the tongue 52 in a pivotable connection 87 (see FIGS. 9a–b), preferably a pin or nut and bolt or any other connection which allows for securement and pivoting action 89, which corresponds to pivotable connections 20 and 68. The interface portions 86, 88 of the plates, which are secured to the cross bar 56, have apertures 90 which correspond to apertures 68 in the cross bar 56.

FIGS. 9a and 9b illustrate side views of the top 80 and bottom 81 plates securing in a sandwich manner the cross bar 56 and being secured to the tongue 52. As can be seen in the figures, plates 80 and 81 are placed face to face sandwiching and being secured to cross bar 56 through holes 90 and 68. The connecting members 82 and 84 in turn are connected to the tongue 52 via the aperture in the adapter bar 51, preferably also in a sandwich configuration at pivot point 87. The connection means 89, as discussed above, is preferably a bolt-like connector which when secured allows pivotal action.

Figure 9C:
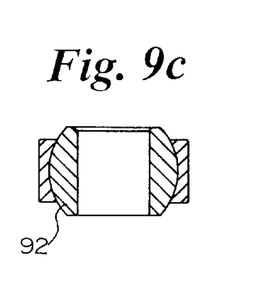
FIGS. 9c–9d show detailed views of a spherical bearing and a bushing, respectively.
Figure 9D:
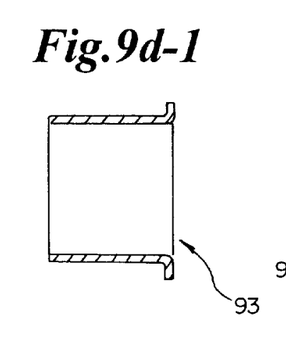
Figure 9D:
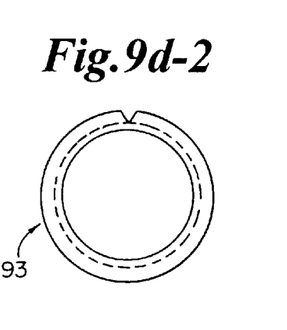

FIG. 9b illustrates a cross section view of a slightly different connection between the plates 80 and 81 and the adapter bar 51. The hole 91 in the adapter bar 51 is slightly larger so as to accommodate a spherical bearing 92 (see FIG. 9c), such as those made by Igubal®. In this case the connection means 89 extends through the connecting members 82 and 84, the adapter bar 51 and the spherical bearing 92, wherein the spherical bearing 92 is situated snugly within the hole 91 of the adapter bar 51. To enhance the fitting of the spherical bearing 92 within hole 91 a flange bushing 93 should be used (see FIG. 9d, which shows top and side views of the bushing). This addition of the spherical bearing at connection 87 not only allows for horizontal or side pivoting, it allows for greater play or flexibility in the up and down directions. As a result the shopping cart adapter may not only pivot from side to side, but may slightly rotate around the longitudinal axis of the adapter bar 51 as well as slightly up and down. This increases the ease of manipulating the shopping cart adapter when collecting shopping carts and decreasing damage caused by running the adapter into objects such as doorways, cars and other carts.

Figure 10:
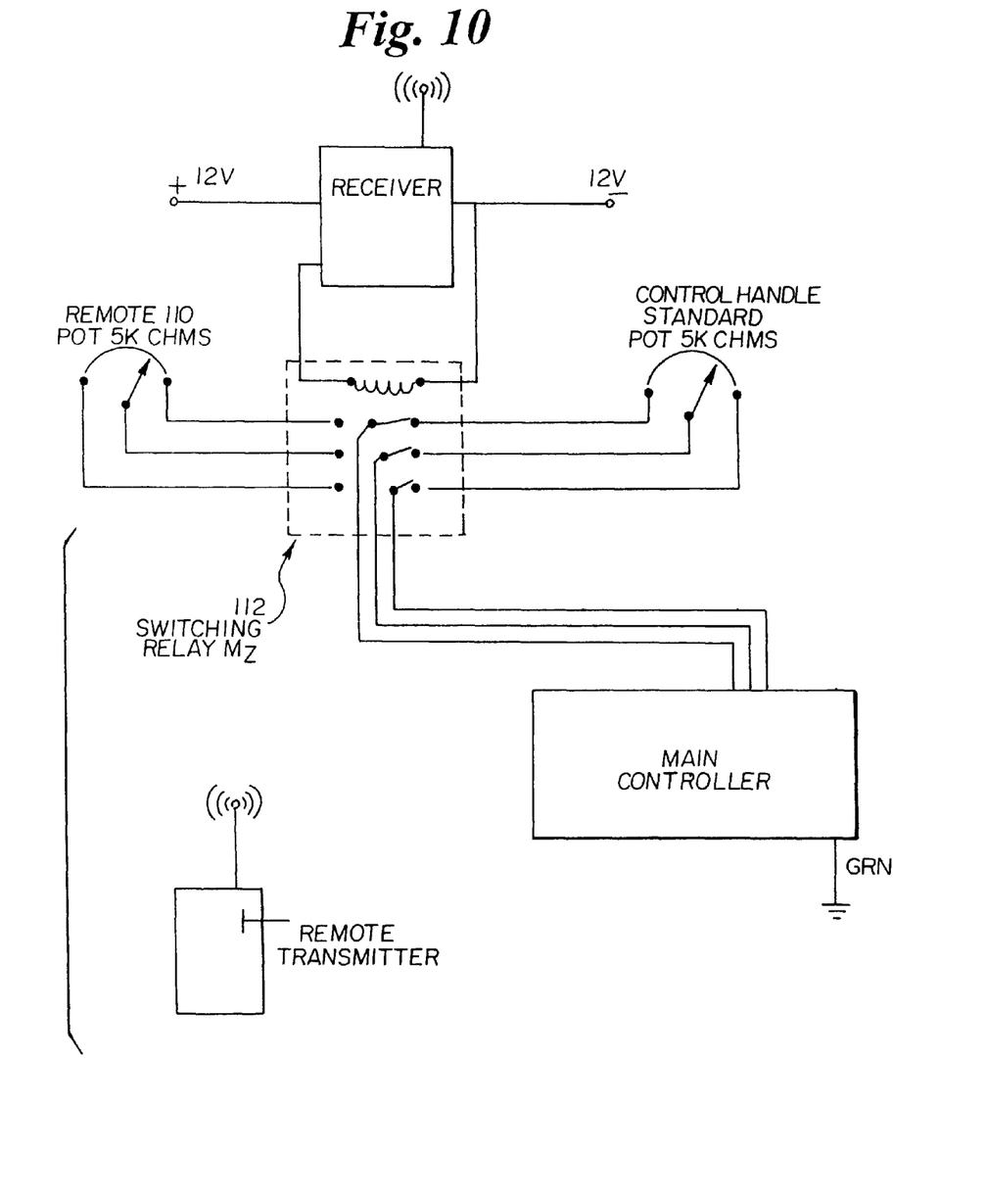
FIG. 10 shows an electronic schematic of the control system of the invention.

As mentioned above, the utility cart may be operated by remote control. In such an operation, the steering lock-out bar 66 is secured to the front end of the utility cart 10 and to the intermediate plate. FIG. 10 is an electrical schematic illustrating the electronic flow path of the preferred embodiment. The user carries a remote control hand unit, preferably a trigger type unit, which controls movement, forward and backward, and the operator steers the shopping carts by directing the forward most cart. The remote control allows for a simple means of moving the utility cart from the front of the long line of shopping carts, where additional carts are added and steering is easiest. The cart is fitted with a receiver, switching relay and additional speed/directional control potentiometer. The remoted potentiometer 110 is pre-set for direction and speed that best fits the operators collection technique and environment. When the remote transmitter button is depressed, the receiver activates the switching relay 112 that selects the pre-set remote potentiometer and disables the twist grip hand control potentiometer. When the remote transmitter button is released the switching relay release and the cart stops. The cart can now be controlled with the twist grip hand control potentiometer.

The actual power controls and monitors of the utility cart may be of any design that would allow the user to monitor and control the power supply. For example, in an electrically control supply the cart would preferably have a power switch, a main circuit breaker to protect the motor from over load, an accessory circuit breaker to protect the control circuit from overloading and a voltmeter to show the state of charge of the batteries.

Figure 11:
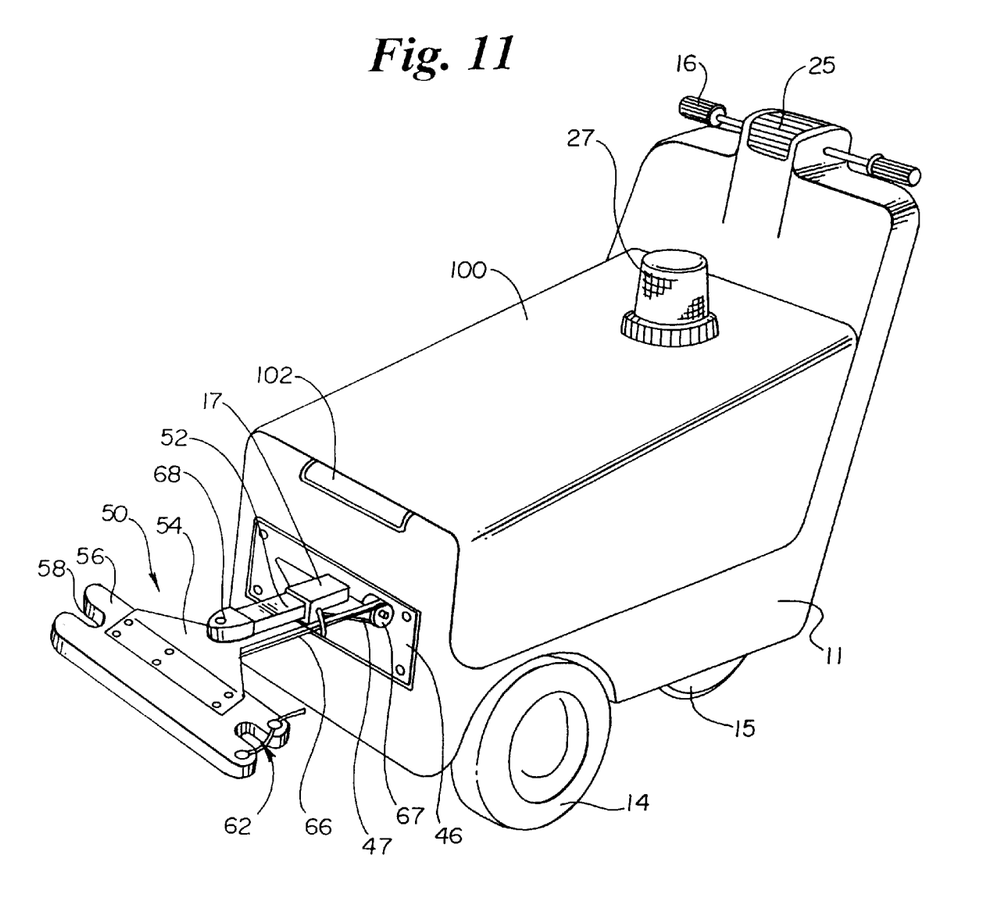
FIG. 11 is a perspective view of an alternative utility cart having a shopping cart adapter fastened thereto.

FIG. 11 illustrates an alternative design of the utility cart with a shopping cart adapter 50, having a retractable hood 100 which is hinged 102 for easy access to the power supply.

Figure 12:
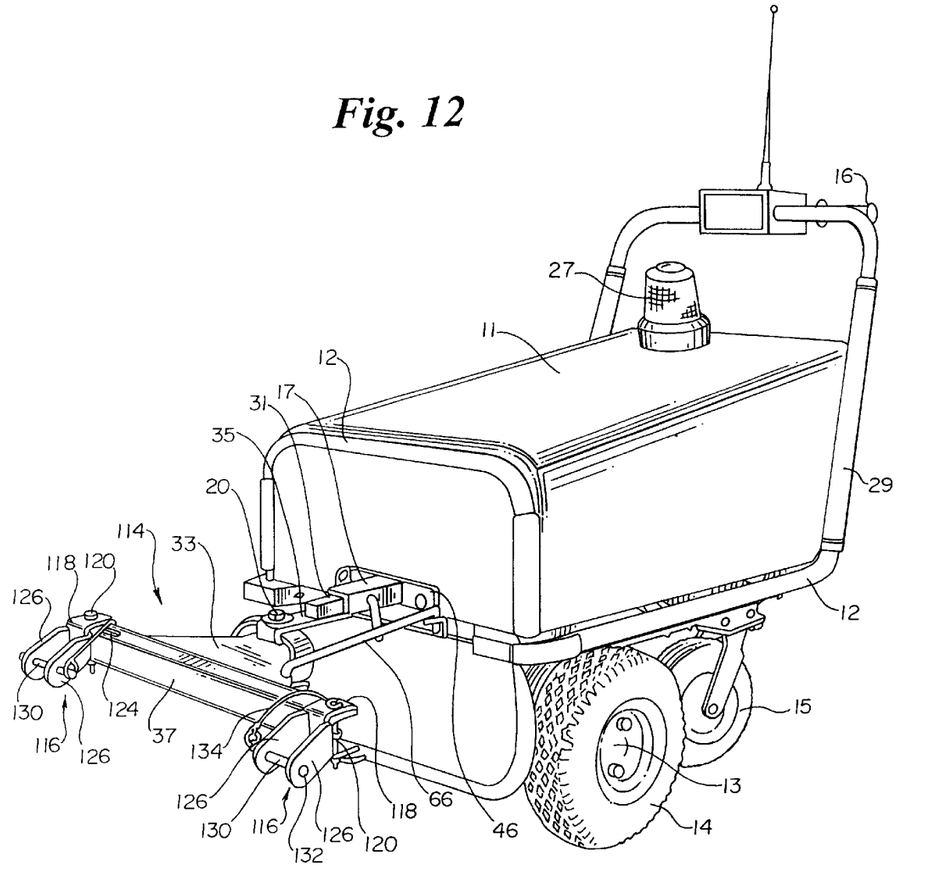
FIG. 12 is a perspective view of an alternative utility cart having a shopping cart adapter fastened thereto.
Figure 13A:
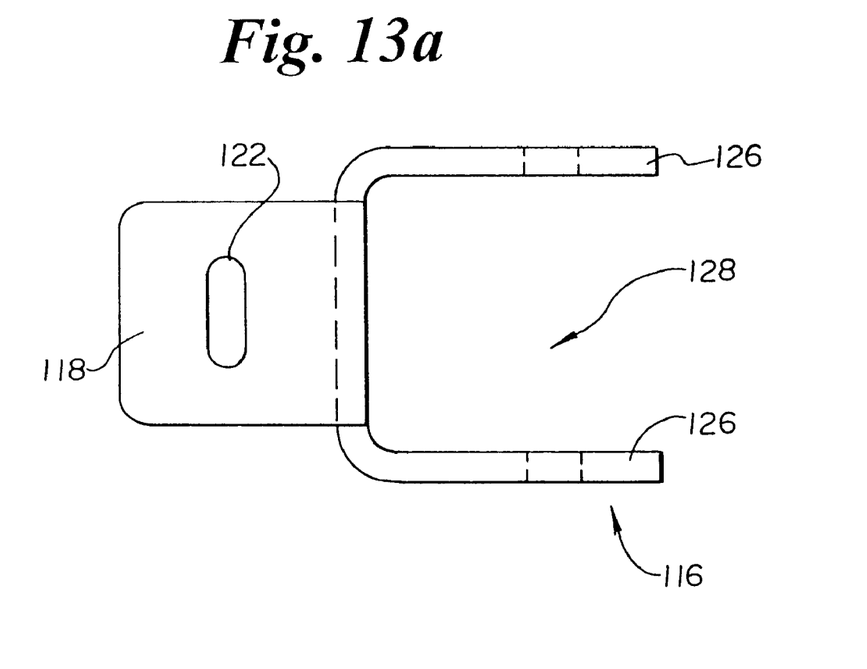
FIGS. 13a–13b show detailed side views of the quick release device of the shopping cart adapter in FIG. 12.
Figure 13B:
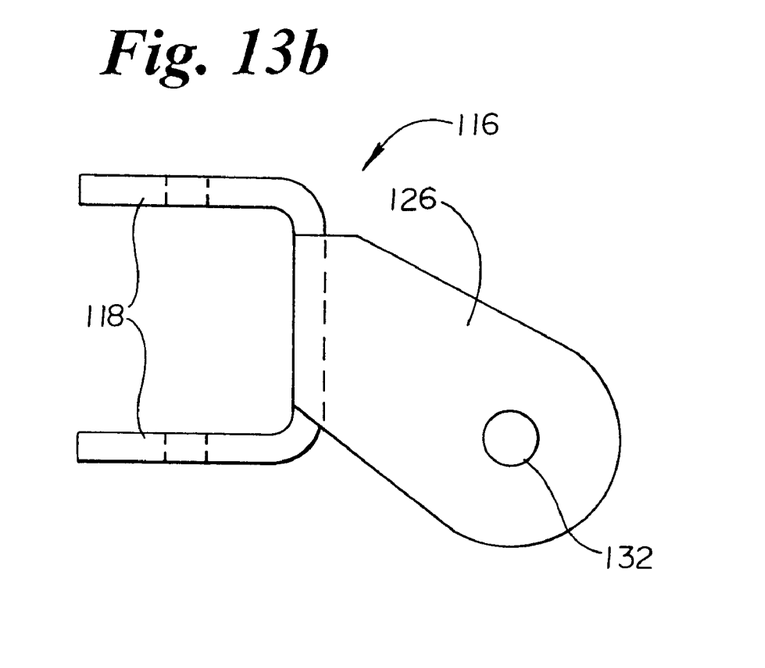

FIG. 12 illustrates another alternative design of the utility cart with a different embodiment of the shopping cart adapter 114, which basically has the same configuration of the above mentioned shopping cart adapter 19, differing only in that it has different adjustable quick connect devices (QCD) 116, which are seen in more detail in FIGS. 13a–b. The QCD 116 is basically a bracket as seen in FIGS. 12 and 13a–b having two inverted C shaped pieces, or connecting members, integrally connected to each other. Connecting member 118 in connected to the C shaped cross bar 37 as demonstrated in FIG. 12. Preferably the QCD 116 is connected to the cross bar via bolts or pins 120. The QCD 116 and/or the cross bar 37 preferably have elongated slots 122, 124, respectively, to receive the bolts/pins 120. The elongated slots 122,124 allow for side to side maneuverability along the cross bar as mentioned above. Connecting member 126 also has a C shape, but is preferably angled as seen in FIG. 13b. Connecting member 126, when assembled, as seen in FIG. 12, faces forward angled downward ready to receive the legs of a shopping cart in space 128. The legs of the carts may be secured via a pin 130 which slides through apertures 132 of connecting member 126. Pin 130 can be tethered 134 to bolt 120.

Other preferable features include a tubular steel frame 12; all season foam filled tires 14; a built in automatic charger;

a safety stop switch; and a front snow plow adapter to hook up to the universal receiver hitch 17. The body of the adapters and the utility cart is preferably made of steel.

The above Examples and disclosure are intended to be illustrative and ot exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A powered apparatus for moving heavy loads, comprising: a housing having a front end and a rear end, power supply enclosed within the housing, a drive means powered by the power supply, means for driving the powered apparatus forward driven by the drive means, propulsion controls and a receiver connection interface having a quick release connection which receives attachments, the quick release connection being interfaced with the front end of the housing, the powered apparatus further comprising a shopping cart adapter releasably connected to the quick release connection, the shopping cart adapter comprising a tongue which directly releasably engages the quick release connection, the tongue having a first end connected to the quick release connection and a second end extending forward from the housing, an intermediate plate pivotally connected to the tongue, the intermediate plate being directly connected to the second end of the tongue and extending forward from the housing and the tongue, the plate being capable of pivoting from side to side on the tongue, and a cross bar mounted horizontally on the intermediate plate, the cross bar being constructed and arranged such as to allow engagement with the legs of a shopping cart, the powered apparatus further comprising adjustable quick connect devices which are mounted on the cross bar and are arranged and configured such as to allow engagement with, and quick release of, the legs of a shopping cart, wherein the adjustable quick connect devices are slidably mounted on the cross bar and comprise a hook-like pivoting connecting arm, a non-pivoting connecting arm and a spring connected to the pivoting connecting arm and the non-pivoting connecting arm, biasing the arms toward one another.

2. A powered apparatus for moving heavy loads, comprising: a housing having a front end and a rear end, power supply enclosed within the housing, a drive means powered by the power supply, means for driving the powered apparatus forward driven by the drive means, propulsion controls and a receiver connection interface having a quick release connection which receives attachments, the quick release connection being interfaced with the front end of the housing, the powered apparatus further comprising a shopping cart adapter releasably connected to the quick release connection, the shopping cart adapter comprising a tongue which directly releasably engages the quick release connection, the tongue having a first end connected to the quick release connection and a second end extending forward from the housing, an intermediate plate pivotally connected to the tongue, the intermediate plate being directly connected to the second end of the tongue and extending forward from the housing and the tongue, the plate being capable of pivoting from side to side on the tongue, and a cross bar mounted horizontally on the intermediate plate, the cross bar having a first end and a second end, wherein both ends have a longitudinal slot for receiving the legs of a shopping cart.

3. A powered apparatus as in claim 2, wherein the slot in the first end is longer than the slot in the second end and wherein the cross bar further comprises a pivotable securing device on the second end, whereby a leg of a shopping cart may be secured within the slot in the second end.

4. A powered apparatus as in claim 3, the intermediate plate comprising two opposing, similarly configured plates, wherein the cross bar is sandwiched between the intermediate plate.

5. A powered apparatus as in claim 4, wherein the connection between the two intermediate plate and the tongue comprises a spherical bearing for a flexible connection.

6. A powered apparatus as in claim 2, further comprising a lock out rod which is connect to the intermediate plate and front of the utility cart, whereby the pivot connection between the intermediate plate and the tongue is rendered fixed.

7. A powered apparatus as in claim 6, wherein the utility cart may be driven by remote control.

* * * * *